July 19, 1960 F. J. MURPHREE, JR 2,946,017
AUTOMATIC VOLUME CONTROL
Filed Dec. 28, 1956
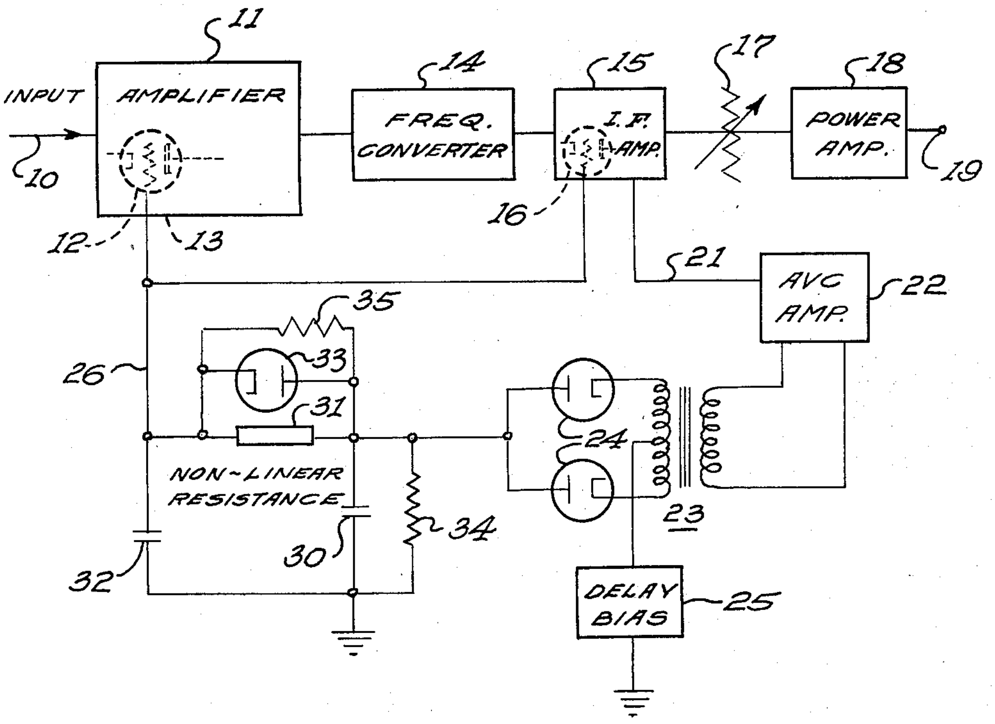
FRANCIS J. MURPHREE, JR.
INVENTOR
BY George Lipkin
Rolla N. Carter
ATTORNEYS 2,946,017
Patented July 19, 1960

2,946,017

AUTOMATIC VOLUME CONTROL

Francis J. Murphree, Jr., Panama City, Fla., assignor to the United States of America as represented by the Secretary of the Navy Filed Dec. 28, 1956, Ser. No. 631,378

2 Claims. (Cl. 330—133)

(Granted under Title 35, U.S. Code (1952), sec. 266)

The invention described herein may be manufactured and used by or for the Government of the United States of America for governmental purposes without the payment of any royalties thereon or therefor.

The present invention relates to automatic volume control systems for electrical amplifying apparatus and has for its principal object the provision of such systems which minimize the period of overload following the application of a sudden strong signal and which have a relatively long time constant for weak signals.

Heretofore, automatic-volume-control (AVC) circuits have been devised which recover quickly from an overload and also recover rapidly after the removal of a signal but the performance of these two functions has been obtained by employing a short time constant which also brought about the suppression of weak signals. Thus, by making the resistance-capacitance product low enough in the AVC rectifier circuit, fast recovery of gain after cessation of a signal could be obtained, but signals might be depressed excessively. In some applications such as, for example, sonar echo-ranging a receiver incorporating a conventional AVC circuit recovers so slowly after strong interference, i.e., a burst of noise or reverberation, echoes from nontargets, etc., that weak target echoes following immediately thereafter may be lost, or such a receiver may overload upon a sudden increase in interference and not regain control soon enough to detect the subsequent echoes. Contrariwise, if the time constant is decreased in order to minimize these effects, echoes may be lost because the gain is depressed too quickly.

In accordance with a preferred embodiment of the present invention a non-linear resistance shunted by a diode cooperates with a capacitance to provide the RC network of an AVC rectifier circuit the arrangement being such that during a charging cycle the negative voltage-resistance characteristic present makes the time constant of the network a function of the instantaneous applied voltage, the high back resistance of the diode having very little effect.

The invention itself, as well as other objects and advantages, will be understood from the following description of the accompanying drawing the single figure of which is a diagrammatic showing of an exemplary amplifying system incorporating the preferred embodiment of the invention.

The amplifying system illustrated for the purpose of describing the invention is a conventional one for amplifying a radio frequency signal appearing on its input lead 10. Signals on the input 10 are fed through an amplifier 11 having at least one controlled stage 12 having a grid 13, a frequency converter 14, an intermediate frequency amplifier 15 having at least one controlled stage 16, a manual volume selecting control 17, and a power amplifier 18 to an output terminal 19. A control signal taken from the output of the last controlled stage in the amplifier 15 on a lead 21 is passed through an AVC amplifier 22 to a transformer 23, the output of which is rectified by two suitable tubes 24. The rectifier is preferably provided with a suitable constant delay bias 25 as is well known.

The rectified output of the tubes 24 is fed through the gain-control system of the invention and a lead 26 to the grids of the controlled amplifier stages 12 and 16. This gain-control system comprises a condenser 30 for filtering the full wave rectified output of the tubes 24, an RC network consisting of a resistor 31 and a capacitor 32, a diode 33 shunting the resistor 31, and a bleeder resistor 34 shunting the condenser 30. If the diode 33 is a high vacuum type it is preferred to shunt the resistor 31 with a resistor 35 having a resistance value of a few megohms. The resistor 31 is nonlinear having a negative voltage-resistance characteristic so that when the voltage across it is relatively great its resistance is low and the capacitor 32 is charged more rapidly and hence the time constant of the combination of the resistor 31 and the capacitor 32 is a function of the instantaneous applied voltage. With commercially available nonlinear resistors it is not difficult to obtain initial time constants that change by a ratio of at least one hundred to one for a voltage change of ten to one. This, of course, means that control of an instantaneous overload is acquired more rapidly than it would be if the resistor 31 were linear. After overload the time constant returns to a value sufficiently high to prevent the loss of weak signals.

The resistor 34 in addition to serving as a bleeder for the condenser 30 also completes the return path to ground for the diode 33. The diode 33 shunting the nonlinear resistor 31 and the resistor 35 is so arranged that during the charging cycle of the gain-control circuit its high back resistance has a minimum effect on the time constant of the circuit whereas when the capacitor 32 begins to discharge the resistors 31 and 35 are essentially shorted and the time constant is largely determined by the capacitor 32 and the resistor 34. By choosing suitably small values for the resistor 34 and the input condenser 30 the time constant can be made quite short, i.e., as short as five milliseconds without any apparent ill effects.

Since the resistor 31 is nonlinear the effective time constant of the circuit is much shorter for very strong signals than it is for weak signals. It is thus easy to design a circuit having a time constant such that relatively weak signals are suppressed very little but that strong pulses or continuous signals are rapidly depressed. Nothing is lost by partially depressing strong pulses since their initial amplitude makes them apparent.

By properly manipulating the values chosen for the capacitor 32 and the resistors 31 and 34 it is easy to design the circuit to provide the three desired features, viz., fast recovery from overload, fast gain recovery, and slow attack time for weak signals. For example, with a particular nonlinear resistor 31 of thyrite whose resistance varies from about sixty megohms at six volts to about one hundred thousand ohms at sixty volts the following values for the other components provide a satisfactory gain-control circuit:

| | | |
|---|---|---|
| Capacitor 30 | mfd | .01 |
| Capacitor 32 | mfd | 1.0 |
| Resistor 34 | ohms | 47,000 |

While for the purpose of disclosing the invention a specific embodiment thereof has been described in detail, it is to be understood that the invention is not limited thereto since it will be obvious to those skilled in the art that the invention may take modified forms to meet various conditions which may be encountered in different specific uses, and it is therefore intended to cover by the appended claims all such modifications which fall within the spirit and scope of the invention.

What is claimed is:

1. An amplifier of variable gain having input and output stages and a volume control circuit, said volume control circuit comprising a rectifier connected to an output stage of the amplifier to provide a detected voltage corresponding to the signal level in said output stage, a capacitor connected to be charged by the detected voltage, a nonlinear resistor having a negative voltage-resistance characteristic connected in series only with the charging path of the capacitor, means coupling the capacitor to at least one input stage of the amplifier to provide variations in the gain of said amplifier in response to variations in the voltage across said capacitor, and a discharge path for the capacitor including a diode connected in shunt to the nonlinear resistor.

2. In a variable gain amplifier having an automatic volume control circuit which provides a detected voltage proportional to the amplified carrier voltage, at least one amplifier stage connected to have its gain controlled in accordance with the detected voltage, and a resistance-capacitance filter section connected between said control circuit and said controlled stage for delaying the application of the detected voltage to said controlled stage, characterized by the resistance component of said filter section having a nonlinear negative voltage-resistance characteristic and by the capacitance component of said filter section constituting the sole circuit for current flowing through said resistance component.

References Cited in the file of this patent

UNITED STATES PATENTS

| | | |
|---|---|---|
| 2,093,095 | Peterson | Sept. 14, 1937 |
| 2,137,401 | Hobbie | Nov. 22, 1938 |
| 2,189,925 | Reinken | Feb. 13, 1940 |
| 2,221,541 | Hathaway | Nov. 12, 1940 |
| 2,399,968 | Whitelock | May 7, 1946 |
| 2,532,347 | Stodola | Dec. 5, 1950 |